Figure 1:
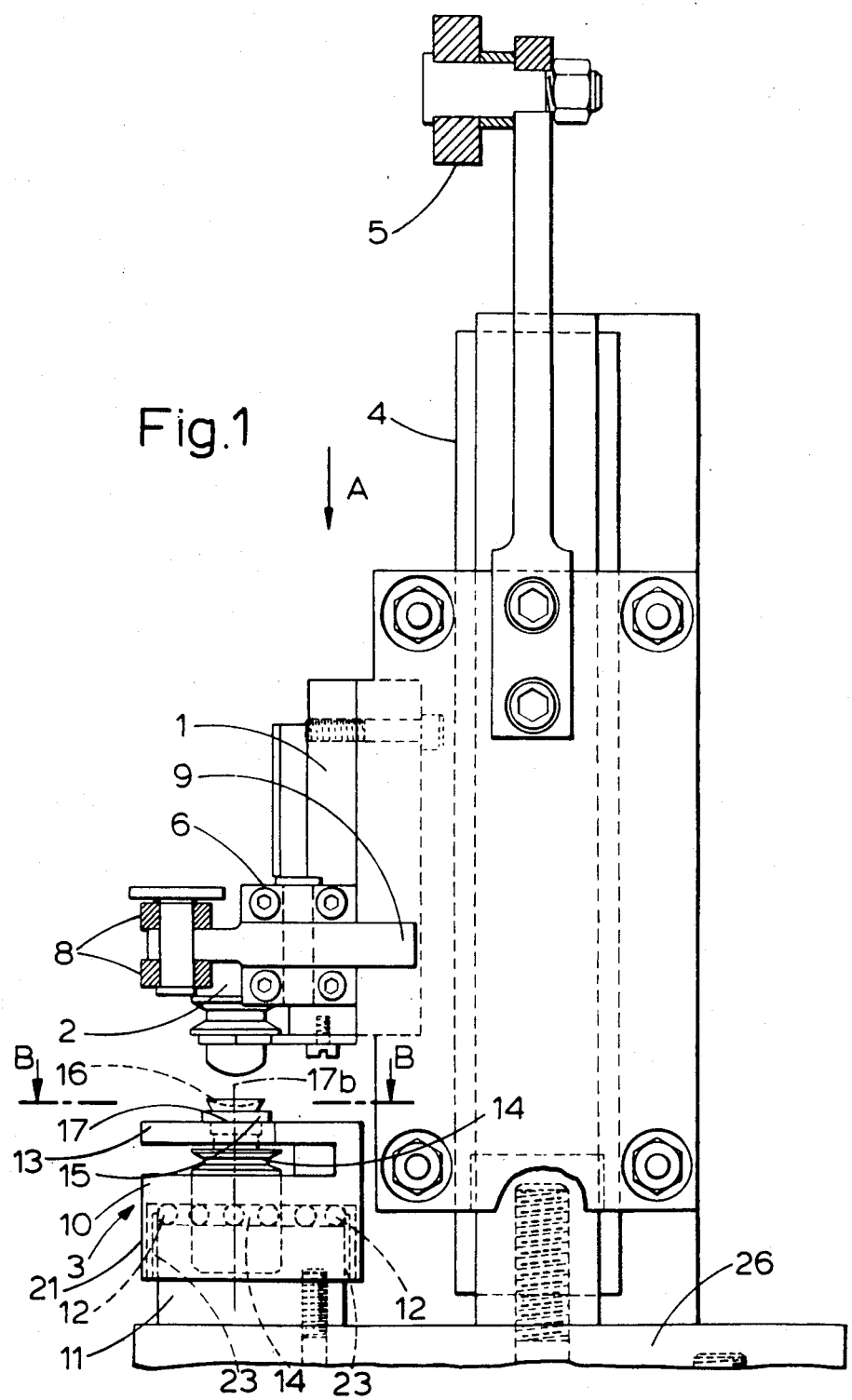

United States Patent [19]

Morland et al.

[11] Patent Number: 4,677,729

[45] Date of Patent: Jul. 7, 1987

[54] METHODING OF MOUNTING A PARTLY FORMED LENS BLANK

[75] Inventors: Albert H. Morland; John T. Phoenix, both of Southampton, England

[73] Assignee: Coopervision, Inc., Menlo Park, Calif.

[21] Appl. No.: 816,120

[22] PCT Filed: Apr. 18, 1985

[86] PCT No.: PCT/GB85/00170

§ 371 Date: Dec. 18, 1985

§ 102(e) Date: Dec. 18, 1985

[87] PCT Pub. No.: WO85/04829

PCT Pub. Date: Nov. 7, 1985

[30] Foreign Application Priority Data

Apr. 19, 1984 [GB] United Kingdom ................. 8410341

[51] Int. Cl.4 .............................................. B23P 19/00
[52] U.S. Cl. ................... 29/426.5; 29/426.3; 29/468; 29/559; 51/217 L; 51/216 LP; 51/284 R; 51/277; 156/295; 156/344
[58] Field of Search ...................... 29/559, 468, 426.3, 29/426.5; 33/180; 51/277, 284 R, 284 E, 216 LP, 261, 217 L; 156/295, 344

[56] References Cited

U.S. PATENT DOCUMENTS

| 3,058,870 | 10/1962 | Stein ..................... 156/344 |
| 3,221,378 | 12/1965 | Faas et al. ................... 51/216 LP X |
| 3,261,131 | 7/1966 | Wetzler et al. ......................... 51/215 |
| 3,266,512 | 10/1966 | Brandt ................................. 51/277 |
| 3,355,342 | 11/1967 | Lanman ............................. 156/295 |
| 3,404,488 | 10/1968 | Cox et al. .............................. 51/284 |
| 3,417,454 | 12/1968 | Beasley .................................. 29/468 |
| 3,501,842 | 3/1970 | Beasley .................................. 33/180 |
| 3,677,853 | 7/1972 | Anzelone, Jr. et al. ......... 156/295 X |
| 4,007,533 | 2/1977 | Brandon et al. ............... 29/426.3 X |
| 4,089,102 | 5/1978 | Soper et al. ..................... 29/559 X |
| 4,158,273 | 6/1979 | Olsen et al. ........................ 51/284 R |
| 4,328,060 | 5/1982 | Tusinski et al. ..................... 156/344 |
| 4,358,913 | 11/1982 | Sorrells ........................... 51/216 LP |
| 4,543,752 | 10/1985 | Kolting .......................... 51/217 L X |

FOREIGN PATENT DOCUMENTS 292868 11/1953 Switzerland .
323066 8/1957 Switzerland .

Primary Examiner—Charlie T. Moon
Attorney, Agent, or Firm—Vorys, Sater, Seymour & Pease

[57] ABSTRACT

The invention relates to a machine for aligning and attaching partly-worked lens blanks to a block so that the remainder of the blank can be machined. The machine comprises a vee-shaped holder for supporting the block with it axis vertical above a moveable table on which the lens blank is supported. The moveable table is freely moveable in any direction in a horizontal plane and the machine includes means for bringing the block and partly-worked lens into contact and achieving alignment of the axes of the block and lens blank by permitting the lens blank to move in any direction in a horizontal plane. A film of liquid adhesive is provided between the surface of the lens blank and the block which acts both as a lubricant and as a bonding agent when correct alignment has been achieved.

8 Claims, 6 Drawing Figures

METHODING OF MOUNTING A PARTLY FORMED LENS BLANK

This invention relates to the manufacture of lenses, especially contact lenses.

Contact lenses are conventionally manufactured by machining suitably sized lens blanks on automatic or semi-automatic lathes. Although according to some machining procedures the lens blank itself is received into the collet of the lathe the more commonly adopted methods involve attaching the lens blank to a chuck which is then received in the lathe collet. After the first curved lens surface has been cut on the blank it is necessary to remove the partly machined blank from the chuck and to then attach it to the second chuck (known in the contact lens art as a "block") so that the opposite lens surface can be formed. This procedure of mounting a partly machined lens blank on a block is known in the art as "blocking". One difficulty in carrying out the blocking operation is to ensure that the optical axis of the partly machined blank is aligned with the axis of the block so that the second lens surface will be cut on the same axis as the first. This procedure is conventionally carried out by manually aligning the blocks and the lens blank and is accordingly an extremely laborious and skilled operation. Failure to achieve accurate alignment of the lens blank and block will lead to the rejection of the lens in final checking owing the poor edge control or prism.

According to the present invention there is provided a method of mounting a partly formed lens blank, having a first lens surface, on a block in order to be able to cut a second lens surface on the blank, said method comprising bringing the block into contact with the first lens surface of the partly formed, e.g. machined, blank while maintaining the axes of the block and blank in a vertical disposition and, while supporting the lower component of the block or blank so that it is free to move in any direction in a plane at right angles to the axes of the block and blank, urging the lens surface and block firmly together with a uniform film of liquid adhesive therebetween, whereby said liquid film acts as a lubricant between the mating surfaces of the block and the lens surface and assists centralisation and alignment of the axes of the blank and block.

The block is conveniently lowered onto a blank, which is supported so that its optical axis is maintained in a vertical disposition, while being free to move to a limited extent in a horizontal plane. If the partly machined lens blank has been machined to form the first lens surface while supported on a chuck, the blank may be transferred directly from its associated chuck to a block.

According to a further aspect of the invention there is provided a blocking machine for centring a partly machined lens blank having a first lens surface to a block in order to machine the opposite lens surface, said machine comprising a holder for supporting one of the components comprising the block and lens blank above a moveable table for supporting the other component, said table in at least one mode, being free to move in any direction in a horizontal plane and means for moving the holder and table towards each other and bringing the first lens surface and block into mutual contact. Preferably, the lens blank is attached to a chuck and the lens blank and chuck supported by the table, while the block is mounted in the holder and lowered under the weight of the holder and block onto the lens blank. The table on which the lens blank and chuck is supported is arranged to be freely moveable in a horizontal plane and this can be achieved by supporting the table on ball-bearings. Preferably the table includes means for selectively locking and unlocking the table so that after the transfer operation, the table can be held solidly.

While the chucks and blocks can be loaded by hand into the holder and table the blocking machine is preferably designed to be loaded and unloaded automatically. The apparatus may include means for automatically applying adhesive to the block and means for breaking the bond between the chuck and the lens after the blank has been bonded to the block.

Figure 2:
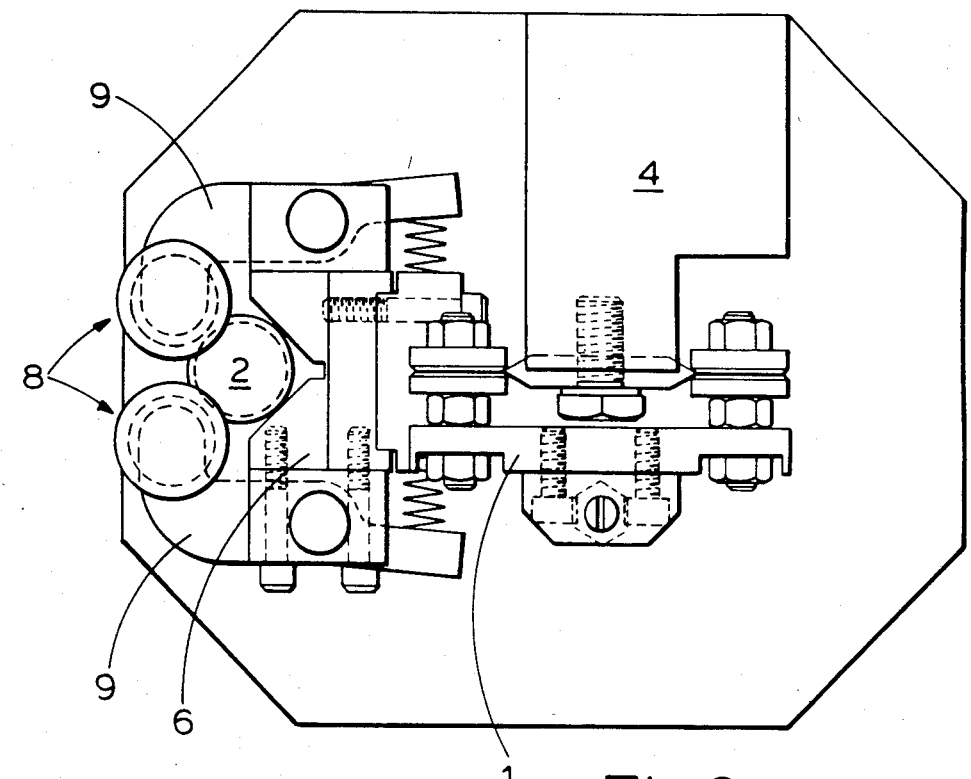
Figure 4:
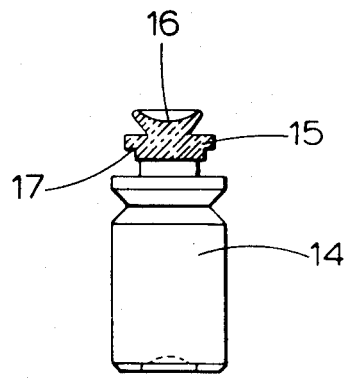
Figure 5:
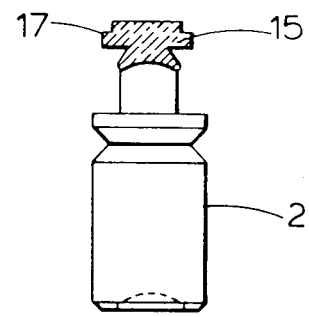
Figure 3:
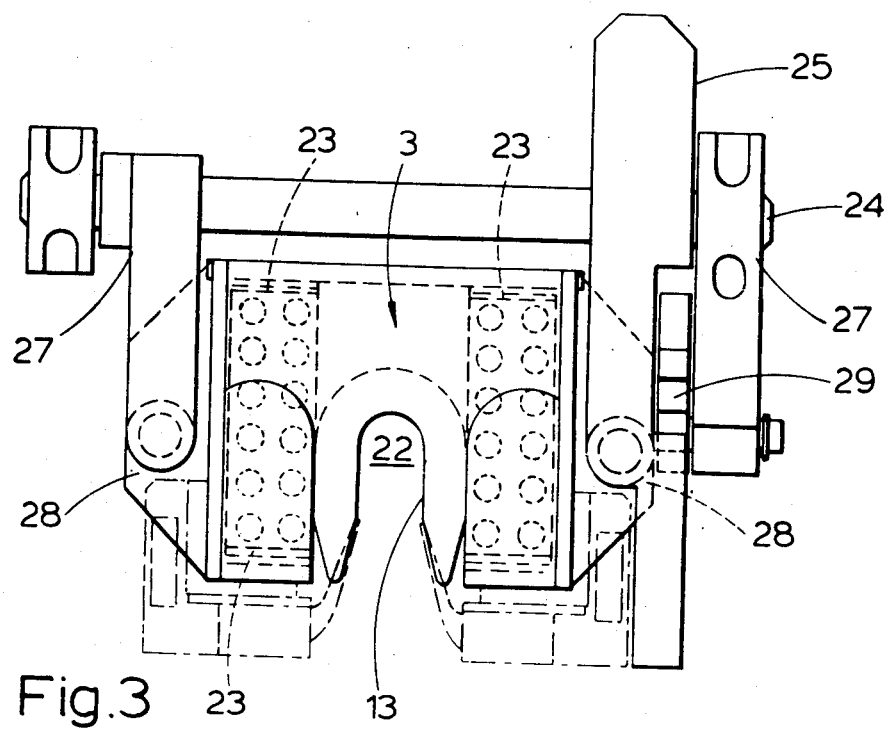
Figure 6:
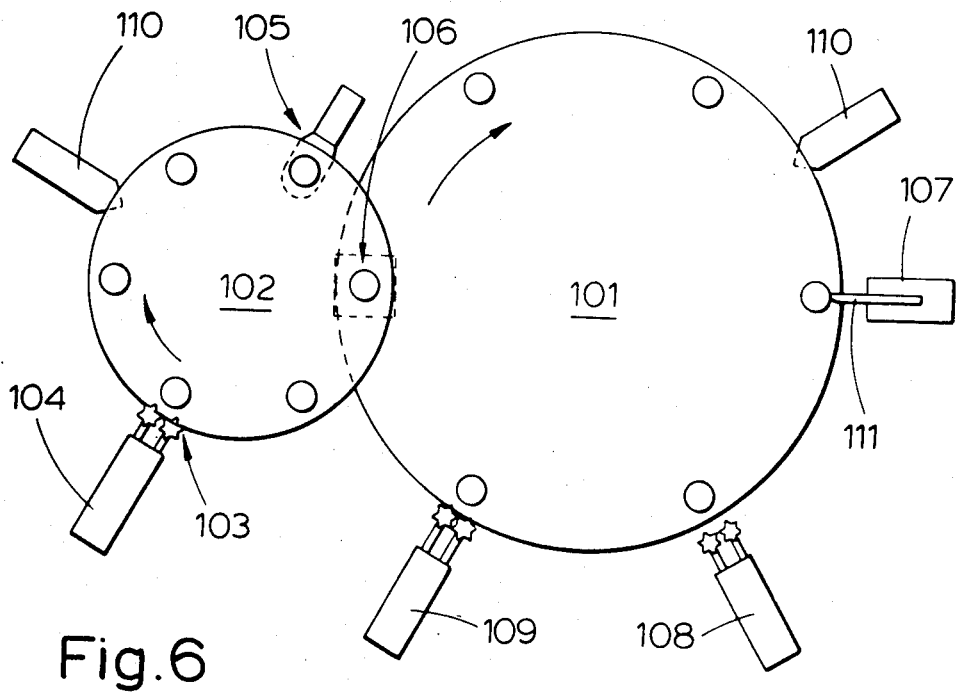

Further features and aspects of the present invention will become apparent from the following description and accompanying drawings. Various embodiments of the invention will now be described by way of example with reference to the accompanying drawings in which:

FIG. 1 is a side elevation of the blocking apparatus showing the block in a position in which the block has almost been lowered to contact the lens blank, FIG. 2 is a view taken in the direction of the arrow A in FIG. 1, FIG. 3 is a view taken on the line B—B in FIG. 1 but showing in addition clamping means for selectively locking the table, FIG. 4 is a side elevation of a chuck with a partly machined lens blank adhered to it, FIG. 5 is a side elevation of a block after the partly machined blank has been transferred to it, FIG. 6 is a schematic view of the blocking apparatus incorporated in an automatic machine.

Referring to FIGS. 1 to 5 of the drawings, the blocking apparatus comprises a carriage 1 for supporting a block 2 vertically above a table 3. Carriage 1 is guided on a slide 4 and may be raised or lowered on the slide 4 manually or by automatic means, such as by a wheel 5 arranged to run on a cam surface (not shown). Carriage 1 comprises a V-shaped block 6 and a pair rollers 8 carried on arms 9 for supporting the block 2.

Table 3 comprises an upper part 10 which is supported on a base 11 by means of a bed of ball-bearings 12 (only some of which are shown in FIGS. 1 and 3) which allow a limited degree of horizontal sliding movement between the upper part 10 and the base 11. As shown best in FIG. 3 the upper part 10 of table 3 includes a fork portion 13 for receiving the chuck 14 and its associated lens blank 15 (for clarity the chuck and lens blank are not shown in FIG. 3).

As can be seen in FIG. 1, the upper part 10 of the table has a depending skirt 21 which surrounds the major portion of the base part 11. In common with the upper part 10, the base part 11 is generally U-shaped when viewed in plan (see FIG. 3) so as to accommodate the body of chuck 14. Ball bearings 12 are located on base part 11 in groups on each side of recess 22 for receiving the body of chuck 14. Upwardly projecting walls 23 are provided to retain the balls in beds on each side of recess 22. The upstanding walls 23 trap the balls 12 in the space between the mutually slideable parts of the table 3 but without restricting their rolling movement. Depending skirt 21 of the upper part 10 limits the extent of mutual horizontal movement of the components of the table, although the upper part 10 is free to move in any direction in a horizontal plane.

The forked portion 13 is open towards the left hand side of the apparatus as shown in FIG. 1 and supports the chuck on the under face of the lens blank 15, the adherent chuck hanging from the forked portion 13. During the first machining operation for cutting the base curve 16, the surface 17 is accurately cut at right angles to the axis 17b of the base curve 16.

The procedure for transferring the lens blank 15 from the lower chuck to the upper chuck or block 2 is as follows. With the lower chuck supported on the fork portion 13 of the table 3 and with the table 3 in its floating mode so that the upper part 10 of the table is free to move in any direction in a horizontal plane on the bearings 12) the carriage 1 is moved down on its slide until the rounded surface of the block 2 touches the base curve 16 of the partly cut blank. Prior to this movement the rounded surface of the block 2 will have been heated and received a measured amount of molten thermoplastic adhesive such as a wax-based adhesive which has been heated to melt it. At this stage the rounded end of the block 2 will be resting on the base curve 16 under the weight of the carriage but guided in by the Vee-block 6 in a vertical disposition. The apparatus is arranged so that the axis of the Vee-block 6 is accurately at right angles to the plane of the upper part 10 of the table 3 and the block 2 is accurately machined as a cylinder. As a consequence of the freedom of the table 3 to move in any direction in a plane parallel to the accurately machined surface 17 of the blank 15, the lens blank 15 adjusts and centralises its position relative to the block 2 so that the axis of the latter lies accurately along the axis on wich the base curve 16 had been cut. The molten adhesive between the block 2 and the surface 16 acts as a lubricant during this centralising movement. Once the adhesive on the end of the block 2 has cooled the composite structure of the block, chuck and lens blank can be removed as one from the apparatus. The bond between the chuck 14 and the blank 15 can then be broken so that the block 2 carrying the blank 15 (see FIG. 4), can then be inserted into the collet of a lathe and a power curve cut on the front surface of the blank.

It will be appreciated that the block and lens blank should be brought together in such a way that a thin, uniform film of molten adhesive exists between the contacting surfaces while the centralising action takes place and before the adhesive cools to form a bond. Obviously the block should not be at a temperature which is so high as to damage the surface of the lens surface. Using a blended resin/wax adhesive it has been found that a suitable temperature for the block is about 90° C., just above the melting point of the adhesive, although the optimum temperature depends on the particular adhesive selected and the nature of the lens polymer. It is currently preferred to bring the block fairly rapidly into contact with the lens blank, by allowing the carriage to run down on a steep cam surface under its own weight. These factors are all related and some experiment will be necessary to arrive at the optimum conditions for a particular choice of lens polymer, adhesive and heat capacity of the lens blank.

As mentioned above the blocking machine may be part of an automatic apparatus which is fed sequentially with blocks and with chucks having adherent lens blanks and the resulting blocks and transferred blanks are unloaded subsequently. Such automatic apparatus may be incorporated in a lens manufacturing procedure as described in our British patent application No. 8313161 (publication No. 2123733) and it may utilise loading and unloading devices similar to those described in our above application.

It is desirable, although not essential, during subsequent operations, e.g. when splitting the chuck from the lens blank, to lock the table 3. Pivotally mounted on a shaft 24 is a clamping arm 25, the shaft 24 being journalled in trunnion blocks 27 secured to base plate 26. Attached to the skirt 21 or upper part 10 of table 3, is a horizontally outwardly projecting web 28. Pivotal movement of clamping arm 25 towards the base plate 26 presses down on the web 28 and holds the upper part 10 of table 3 rigidly. A spring-biassed latch 29 locks the clamping arm in the clamped position. The upper part 10 of table 3 can be instantly released by disengaging the latch 29, which is formed with a detent to hold the arm 25 up in its disengaged position.

FIG. 6 is a schematic plan view of such an automatic blocking apparatus which consists of a pair of carousels 101 and 102 rotatable in the direction of the arrow. Each carousel has a number of stations at which the operations to be described are carried out and means are provided to rotate the carousels in timed sequence from one station to the next. Blocks 2 (as shown in FIG. 1) are loaded (with their rounded ends projecting downwardly below the plane of the carousel) one after another at station 103 to carousel 102 using a star-wheel loading device 104 of the kind illustrated in FIG. 6 of our above-mentioned British Patent Application. Carousel 102 incorporates a heater so that by the time the blocks have reached station 105 their temperature is higher than the melting point of a waxy thermoplastic adhesive. This is applied at station 105 by lifting a bath of molten adhesive into contact with the rounded end of the block. At station 106 the blocks are transferred into the open arms 9 of the Vee-block 6 which is mounted on the carousel 101. Devices 110 are wedges which are arranged to lock the carousels after each indexing step. Carriage 1 moves down on slide 4 under the control of the wheel 5 sliding on a cam surface and the table 3 at this point is unlocked so that the upper part 10 is floating on the bearings 12. The rounded tip of the block is lowered onto the surface 16 of the lens blank. In this condition of the apparatus, the block hangs vertically in the Vee-block 6 and with the table 3 free to move in a horizontal plane, the block is centralised and aligned with respect to the lens blank. After the adhesive has cooled the lens and its adherent block and chuck move to the next station (107) at which the bond between the lens blank and the chuck is broken by means of a thin wedge-shaped tongue 111 which projects in one sharp movement between the fork portion 13 and the remainder of the upper part 10 of the table 3. Chucks are ejected after splitting the bond with the lens blank. Upper part 10 of table 3 is locked just before the tongue breaks the bond between the chuck and blank. Blocks and adherent lens blanks are removed by a star wheel unloading device at station 108 into magazines for transfer to the front curve lathe. Station 109 also includes a star wheel loading device to load chucks and adherent blanks from a magazine to table 101.

We claim:

1. A method of mounting a partly formed lens blank, having a first accurately cut lens surface, on an upper block in order to be able to cut a second opposite lens surface on the blank, said method comprising bringing the upper block into contact with the first accurately cut lens surface of the blank, said blank being secured on a lower support component, while maintaining the axes of the upper block and blank secured on said lower support component in a vertical disposition and, while supporting the lower support component and blank so that it is free to move in any direction in a horizontal plane, urging the first accurately cut lens surface and upper block together with a film of liquid adhesive therebetween, whereby said adhesive acts as a lubricant between mating surfaces of the upper block and the first accurately cut lens surface and assists centralisation and alignment of the axes of the blank and upper block, and removing said lower support component from said lens blank.

2. A method according to claim 1 wherein the upper block and first accurately cut lens surface are urged together by virtue of the weight of the upper component of the lens block.

3. A method according to claim 1 or claim 2 wherein said lower support component is a chuck and said first lens surface is a machined surface.

4. A method according to claim 3 wherein the upper block is lowered onto the lens blank with the latter supported in an upright attitude on said lower support component while being free to move in a horizontal plane.

5. A method according to claim 4 wherein the lens blank is supported in or on a table while mounted for limited horizontal movement on bearings.

6. A method according to claim 1 wherein said adhesive is a hot melt adhesive and is applied to the block or blank just prior to bringing them together.

7. A method according to claim 4 wherein the sequence of operations comprises feeding the upper block to a vee-shaped support, lowering the support onto the lens blank with a liquid adhesive between the mating surfaces, causing centring of the lens blank with respect to the upper block by permitting the lens blank to move relatively to the upper block in any direction in a horizontal plane under the load applied by the upper block and its support, and allowing the adhesive to set.

8. A method according to claim 7, wherein the lens blank is supported in a forked member mounted for sliding movement in a horizontal plane while the block and lens blank are urged together.

* * * * *